Nov. 26, 1940.  C. J. GRAY  2,222,767
HOP PICKING MACHINE
Filed Aug. 9, 1939  2 Sheets-Sheet 1
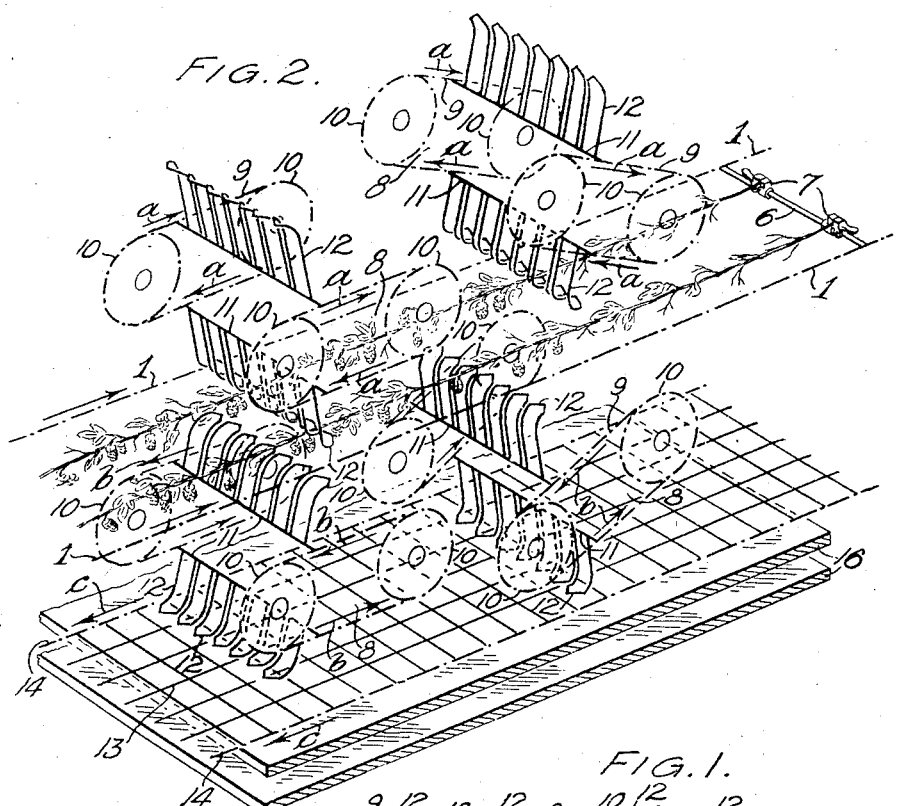
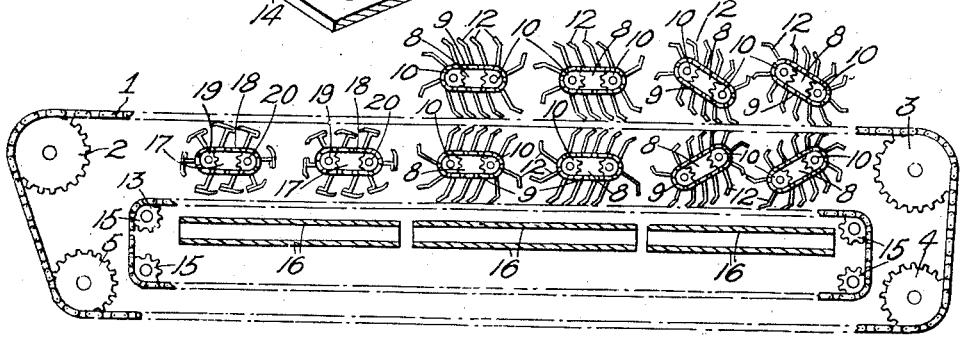
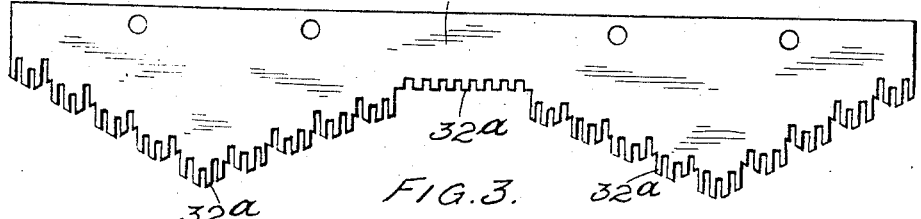
Inventor,
Charles John Gray
By, Mock & Blum
Attnys Nov. 26, 1940.    C. J. GRAY    2,222,767
HOP PICKING MACHINE
Filed Aug. 9, 1939    2 Sheets-Sheet 2
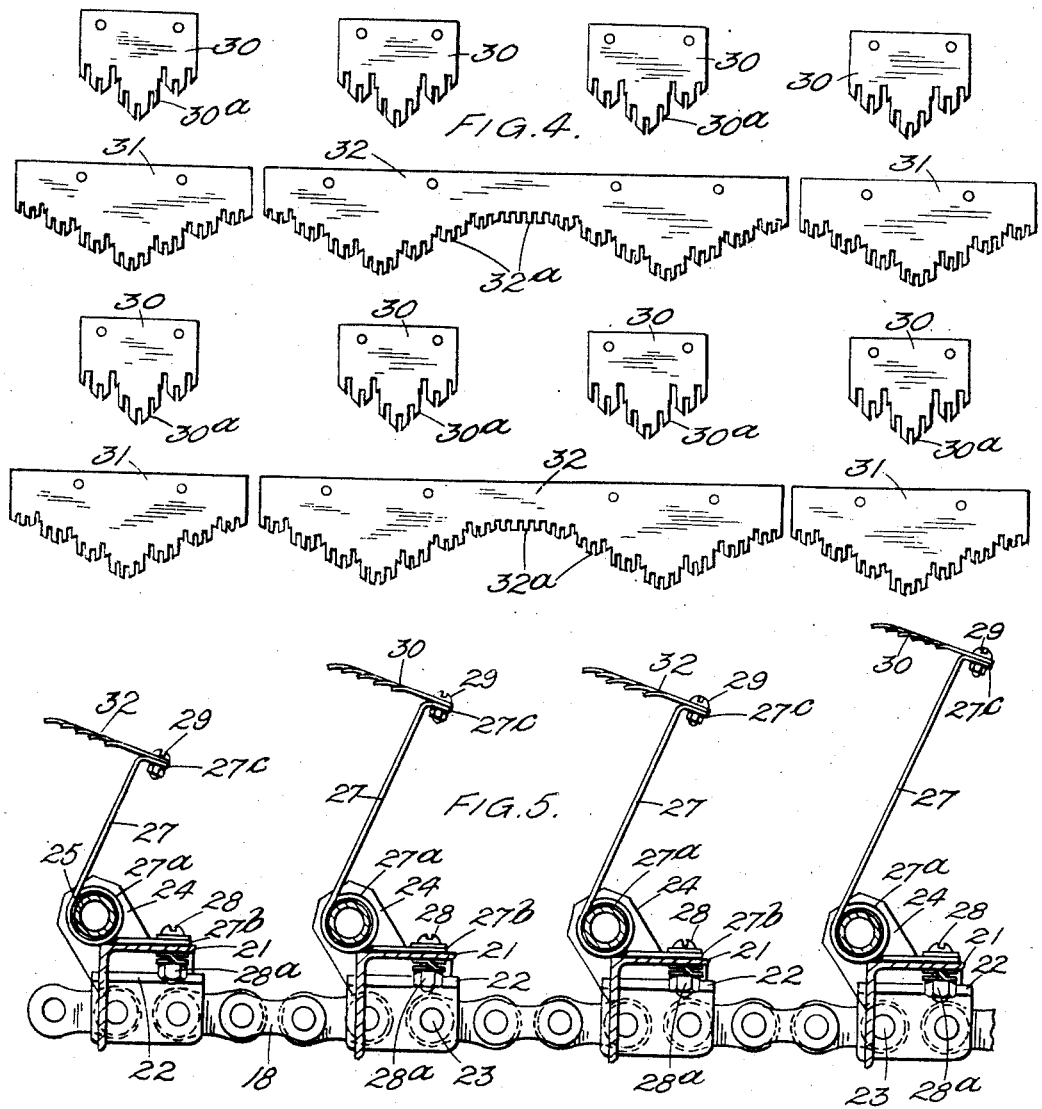
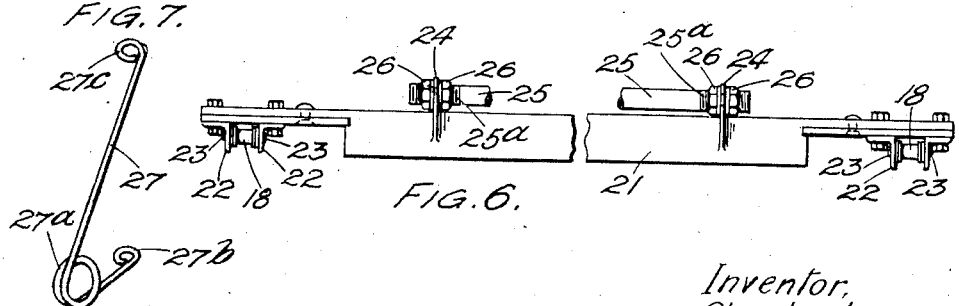
Inventor,
Charles John Gray
By, Mock & Blum
Attnys.

Patented Nov. 26, 1940

2,222,767

UNITED STATES PATENT OFFICE 2,222,767

HOP PICKING MACHINE

Charles John Gray, Pinner, England, assignor to Arthur Guinness Son & Company Limited, London, England Application August 9, 1939, Serial No. 289,133
In Great Britain August 20, 1938

2 Claims. (Cl. 130—30)

The present invention relates to hop picking machines of the kind in which the bine, after having been cut from the plant, is attached to a conveyor which draws it past one or more series of transverse rows of moving projections or picking fingers carried upon rotating drums, chains, or the like, and which are designed to engage the hops and pull them from the short stalks or stems by which they are attached to the bine, the arrangement being such that the effective portions of the paths of movement of the projections or picking fingers is parallel or substantially parallel to the effective portion of the path of movement of the conveyor.

Hitherto, in machines in which the picking fingers, during their effective movement, have travelled in a direction more or less parallel to the length of the bine, the fingers have been in the form of wire loops, these wire loops in some cases having V-shaped or undulated outer ends, intended to engage or catch the hops and pull them from the bines.

This has, however, been subject to the disadvantage that should the hops be engaged by any parts of these wire loop fingers other than their V-shaped or undulated outer ends they are usually damaged by the fingers.

According to the present invention, picker fingers are constructed in the form of comparatively wide plates each of which is provided along the edge portion of its outer end with a series of comparatively closely spaced slots, in order that the greatest possible part of each finger shall be effective to correctly engage the hops and detach them. Preferably the picker plates are resiliently mounted.

The contour of the outer edge portion in which the slots are formed may be of obtuse angular form, that is to say, so that the two half lengths of the edge are oppositely inclined with respect to the longitudinal central axis of the plate.

Preferably, the picker plates are provided along their lateral edges with inclined slots so arranged that should any of the hop carrying stalks or stems ride along these edges they will become effectively engaged by the said slots.

The edges of the plates may be feathered or tapered, and if desired the edges thereof bounding the inner ends of the slots may also be tapered.

Although, throughout the foregoing description, it is stated that the invention is carried into effect by the use of slotted plates, the effect obtainable by said slots may equally well be secured by providing the edge of a plate with suitably spaced pins, the spaces between which pins serve the same purpose as the slots of the plates.

It will therefore be understood that the expression "closely spaced slots" is intended to extend to spaces between pins such as just described.

The invention will now be described, by way of example, with reference to the accompanying drawings, in which—

Fig. 1 is a diagrammatic longitudinal sectional view of part of a machine in which the present invention is embodied.

Fig. 2 is a diagrammatic perspective view of a part of the machine.

Fig. 3 is a plan of the picker plates.

Fig. 4 is a plan, to a smaller scale, showing the manner in which the plate shown in Fig. 3 and other similar plates of a different shape are arranged across the picking units, the other parts of the latter having been omitted for the sake of clearness.

Fig. 5 is a longitudinal section of part of a picking unit.

Fig. 6 is a view showing one of the transverse bars of one of the units.

Fig. 7 is a perspective view of one of the resilient picker plate carriers.

Referring to Figs. 1 and 2 of the accompanying drawings, the main conveyor to which the bines are attached comprises a pair of parallel endless chains 1, 1, arranged in spaced relationship and each carried by suitably driven sprocket wheels such as 2, 3, 4 and 5, so that the chains constitute the sides of a conveyor, the effective portion of which constitutes a series of transverse bars such as 6, extending between the chains, and spaced at equal distances apart of from thirteen to sixteen feet.

Each of the bars 6 is provided with hand actuated clamps, indicated diagrammatically in Fig. 2 by 7, for each gripping the end of the bine to the bar, so that the bine will be carried forward into the machine by the top run of the conveyor, and as it approaches the bar end, be pulled beneath picking units, each indicated generally by 8.

The picking units 8 each comprise endless chains 9, 9, carried between pairs of suitably driven sprockets 10, 10.

Extending between the chains 9, 9, is a series of rods such as 11, Fig. 2, each carrying a series of looped wire picking fingers 12 having V-shaped outer extremities, the loops of one row being arranged in half-pitch staggered relationship with the preceding and the succeeding row, the majority of the rods 11 and the fingers 12, however, being omitted from the drawings in order to avoid confusion.

The picking units just described are so driven that those pickers 12 adjacent the conveyor travel in the reverse direction to the upper run of the conveyor, as shown by the arrows a, Fig. 2, in order to engage with and pull hops from the bine.

Disposed beneath each of the picking units 9, and below the upper run of the conveyor is a further picking unit 8 driven in the direction of the arrows b and arranged the reverse way round to the upper picking unit, to pick some of those hops which are hanging downwardly from the bine undergoing treatment by the upper units 8.

Located between the runs of the conveyor is an endless wire mesh screen 13 carried between endless chains 14, in turn carried by suitably driven sprocket wheels 15, in a manner such that the upper and lower runs of this screen are parallel with the upper and lower runs of the main conveyor.

The screen 13 is of such mesh that any improperly picked hops, that is to say hops which are still attached to the short stalks or stems by which they were originally attached to the bine, fall onto the upper run of the screen and are carried thereby beneath the lower picking units 8 in the direction of the arrows c, in order that the fingers 12 on the lower sides of the bottom units 8 will pull these hops from the stalks or stems, the hops so separated then falling through the screen onto transversely arranged horizontal endless band conveyors 16 passing between the upper and lower runs of the screen.

The short stalk or stem portions fall off the ends of the upper run of the screen 13.

Leaves pass through the screen with the hops, onto the transverse band conveyors 16, but these are subsequently separated from the hops in any suitable manner.

The endless band conveyors 16 are carried by suitable rollers, not shown, which are driven in any suitable manner, so that these conveyors travel in the same direction.

The screen 13 is of such length that its upper run also extends beneath the part of the upper run of the conveyor preceding the picking units 8, and disposed between this part of the screen and the underside of the conveyor are picking units such as 17, which will now be described.

Each of the picking units 17 comprises a pair of chains 18, 18 arranged in parallel relationship and each carried by sprocket wheels 19, 20.

Arranged at regular intervals along and carried between the chains 18, 18, are bars 21.

The bars 21 are provided at their ends with brackets 22 attached, by pins 23, to the chains 18.

Formed integral with each bar 21, at points near the ends thereof, are forwardly and upwardly projecting lugs 24, 24, each pair of which lugs is drilled to carry a hollow rod 25, which is screw threaded at its outer end portions 25a to receive nuts 26 by which the rod is firmly secured in the lugs.

Carried upon each of the rods 25 are helical springs forming portions 27a of a series of substantially L-shaped members 27 (see Fig. 7), the outer or free ends of the horizontal limbs of which are formed into eyes 27b, and the upper ends of the vertically inclined limbs of which are formed into eyes 27c.

The eyes 27b are secured by bolts 28 and nuts 28a to the bars 21, as shown in Fig. 5, and secured by bolts 29 and 29a to the eyes 27c of alternate rows of the members 27, are plates 30, and to the eyes 27c of the intermediate rows of members 27 are similarly secured plates 31 and 32, so that these plates are arranged as seen in plan in Fig. 4, one of the plates 32 being shown to a larger scale in Fig. 3.

The total number of the plates on each of the units 17 is a multiple of four, each four rows being staggered in height, as shown in Fig. 5.

As will be seen, more clearly in Figs. 3 and 4, the oppositely inclined forward edge portions of the plates 30 and 31 are provided with slots 30a and 31a, respectively, the forward oppositely inclined edges of the plates 32 being similarly provided with slots 32a, which last mentioned slots are also provided along the middle portions of the front edges of these plates.

In Fig. 5 it will be seen that the teeth formed between the slots are provided with a downwardly curved set, and each of the plates inclines upwardly in a forward direction.

The helical spring portions 27a are of an internal diameter sufficiently larger than the external diameter of the rods 25, to allow an unrestrained degree of flexure to the vertically and rearwardly inclined limbs of the members 27.

The arrangement just described is such that the picker plates pick hops from the underside of the bine and at the same time considerably assist in pulling those hops which (owing to the fact that they are still attached to their short stalk or stem portions) have failed to pass through the screen from such short stalk or stem portions.

Preferably, in all forms of the invention, the slotted plates of each row are arranged with their outer effective edges upon an undulated line, the plates of the succeeding row being similarly arranged, but preferably in a manner such that their outer effective edges are disposed upon an oppositely undulated line.

If desired, means may be provided whereby one or more of the picking units of the machine just described may be reciprocated toward and away from the main conveyor, in suitably timed relationship to the passage, past the unit or units, of the transverse bars of the conveyor to avoid the picker fingers or plates fouling same, in order that the fingers or plates shall be brought into more intimate contact with the bine.

Although in the embodiment just described, the picker units have been so driven that the fingers travel in an opposite direction from that in which the bine is travelling, while they are picking the hops therefrom, one or more of the picking units may be so driven that the pickers operating upon the bine travel in the same direction as the latter, but at a much slower speed.

I claim:

1. A hop picking machine comprising a conveyor for drawing the bines lengthwise and parallel to its length in a horizontal plane, and a plurality of rows of picking members extending transversely of said conveyor and arranged so as to act upon the stalks of the bines carried by said conveyor and detach the hops therefrom, said picking members comprising plates, comb-like series of teeth projecting from said plates toward the oncoming bines to detach the hops by a combing action and arranged in step formation with respect to the direction of movement of the bines, so that the effective length of the teeth bearing portion of each of said plates is greater than the end to end length of the plate and a maximum number of hops are detached by said plate.

2. A hop picking machine comprising a conveyor for drawing the bines lengthwise and parallel to its length in a horizontal plane, and a plurality of rows of picking members extending transversely of said conveyor and arranged so as to act upon the stalks of the bines carried by said conveyor and detach the hops therefrom, said picking members comprising plates, two comb-like series of teeth projecting from each of said plates toward the oncoming bines to detach the hops by a combing action and arranged in step formation with respect to the direction of movement of the bines, said series being arranged upon oppositely inclined lines to form an apex at the middle of the effective portion of the plate, so that the effective length of the teeth bearing portion of each of said plates is greater than the end to end length of the plate and a maximum number of hops are detached by said plate.

CHARLES JOHN GRAY.